(12) United States Patent
Su et al.

(10) Patent No.: US 11,979,212 B2
(45) Date of Patent: May 7, 2024

(54) METHOD AND APPARATUS FOR DETERMINING CHANNEL STATE INFORMATION

(71) Applicant: DATANG MOBILE COMMUNICATIONS EQUIPMENT CO., LTD., Beijing (CN)

(72) Inventors: Xin Su, Beijing (CN); Hui Li, Beijing (CN); Runhua Chen, Beijing (CN); Qiubin Gao, Beijing (CN); Deshan Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 497 days.

(21) Appl. No.: 17/275,654

(22) PCT Filed: Aug. 7, 2019

(86) PCT No.: PCT/CN2019/099687
§ 371 (c)(1),
(2) Date: Mar. 11, 2021

(87) PCT Pub. No.: WO2020/057284
PCT Pub. Date: Mar. 26, 2020

(65) Prior Publication Data
US 2022/0045730 A1 Feb. 10, 2022

(30) Foreign Application Priority Data

Sep. 21, 2018 (CN) .......................... 201811108580.0

(51) Int. Cl.
*H04B 7/06* (2006.01)
*H04L 5/00* (2006.01)

(52) U.S. Cl.
CPC .......... *H04B 7/0626* (2013.01); *H04B 7/0632* (2013.01); *H04B 7/0639* (2013.01); *H04L 5/0051* (2013.01)

(58) Field of Classification Search
CPC .. H04B 7/0626; H04B 7/0632; H04B 7/0639; H04B 7/063; H04B 7/0413;
(Continued)

(56) References Cited

U.S. PATENT DOCUMENTS

2015/0029966 A1* 1/2015 Park .................. H04L 5/005
370/329
2018/0042028 A1 2/2018 Nam et al.
(Continued)

FOREIGN PATENT DOCUMENTS

CN 106209330 A 12/2016
CN 107005293 A 8/2017
(Continued)

OTHER PUBLICATIONS

Huawei et al.,"Discussion on enhancements for non-coherent JT", 3GPP TSG RAN WG1 Meeting #88, Athens, Greece, Feb. 13-17, 2017, total 6 pages, R1-1703063.
(Continued)

*Primary Examiner* — Candal Elpenord
(74) *Attorney, Agent, or Firm* — Kilpatrick Townsend & Stockton LLP

(57) ABSTRACT

The present application relates to the field of communications and provides a method and apparatus for determining channel state information (CSI). The method includes a network side device determines a measurement mode for CSI, the measurement mode being that the network side device performs transmission using M code words by means of transmit points corresponding to M demodulation reference signal (DMRS) port groups, and M is greater than or
(Continued)

equal to 1, and each of the code words corresponds to one DMRS port group, the network side device determines N CSI-RS resources according to the measurement mode, the N CSI-RS resources being used for a terminal to determine CSI of transmit channels corresponding to the M code words, the transmit channels corresponding to the code words being transmit channels from the transmit points of the code words to the terminal, M being less than or equal to N.

14 Claims, 8 Drawing Sheets

(58) Field of Classification Search
CPC ... H04L 5/0051; H04L 5/0035; H04L 5/0023; H04L 5/005; H04L 5/0057; H04L 5/0048; H04W 72/23
USPC .................................................. 370/329–330
See application file for complete search history.

(56) References Cited

U.S. PATENT DOCUMENTS

| | | | |
|---|---|---|---|
| 2018/0049236 A1 | 2/2018 | Sun et al. | |
| 2019/0372697 A1* | 12/2019 | Wang | H04J 13/0077 |
| 2021/0091902 A1* | 3/2021 | Yamada | H04W 16/28 |
| 2021/0143870 A1* | 5/2021 | Faxér | H04B 7/0626 |
| 2021/0258060 A1* | 8/2021 | Gao | H04B 7/0632 |

FOREIGN PATENT DOCUMENTS

| | | |
|---|---|---|
| CN | 107370559 A | 11/2017 |
| CN | 107733502 A | 2/2018 |
| CN | 107733618 A | 2/2018 |
| WO | 2017193993 A1 | 11/2017 |

OTHER PUBLICATIONS

Zte,"Other enhancements for NC-JT", 3GPP TSG RAN WG1 Meeting #90, Prague, Czechia, Aug. 21-25, 2017, total 6 pages, R1-1712316.

Catt,"Considerations on multi-TRP/panel transmission for Rel-16,"3GPP TSG RAN WG1 Meeting #94bis, Chengdu, China, Oct. 8-12, 2018, total 10 pages, R1-1810555.

Catt,"Multi-TRP/panel transmission enhancement for Rel-16", 3GPP TSG RAN WG1 Meeting #95, Spokane, USA, Nov. 12-16, 2018, total 12 pages, R1-1812635.

3GPP TR 36.741 V1 .0.1, 3rd Generation Partnership Project; Technical Specification Group Radio Access Network; Study on Further enhancements to Coordinated Multi-Point (CoMP) Operation for LTE (Release 14), total 23 pages, Feb. 2017.

Zte et al., "Enhancements to QCL assumptions for DM-RS antenna ports", 3GPP TSG RAN WG1 NR #88bis, Spokane, USA, Apr. 3-7, 2017, total 3 pages, R1-1704423.

Intel Corporation,"Remaining Issues on Beam Management", 3GPP TSG RAN WG1 Meeting #92bis, Sanya, China, Apr. 16-20, 2018, total 7 pages, R1-1804714.

Samsung,"Discussion on DL/UL multi-TRP/-panel supports", 3GPP TSG RAN WG1 Meeting 90bis, Prague, CZ, Oct. 9-13, 2017, total 8 pages, R1-1717598.

3GPP TS 38.214 V15.1.0, 3rd Generation Partnership Project; Technical Specification Group Radio Access Network; NR; Physical layer procedures for data (Release 15), total 77 pages, Mar. 2018.

* cited by examiner

METHOD AND APPARATUS FOR DETERMINING CHANNEL STATE INFORMATION

CROSS-REFERENCE OF RELATED APPLICATIONS

The present application is a National Stage of International Application No. PCT/CN2019/099687, filed on Aug. 7, 2019, which claims the priority from Chinese Patent Application No. 201811108580.0, filed with the Chinese Patent Office on Sep. 21, 2018 and entitled "Method and Apparatus for Determining Channel State Information", both of which are hereby incorporated by reference in their entireties.

FIELD

The present application relates to the field of communication technologies, and particularly to a method and apparatus for determining channel state information.

BACKGROUND

The mobility and broadband have become the development direction of modern communication technologies. The 5G, i.e., the fifth-generation mobile phone action communication standard, is also known as the fifth-generation mobile communication technology, and is also the extension after 4G. As the main direction of the development of the new generation of information communication, the 5G will penetrate into all fields of the future society and build a comprehensive information ecosystem with users as the center.

The MIMO (Multiple-Input Multiple-Output) technology refers to the use of multiple transmitting antennas and receiving antennas at the transmitting end and receiving end respectively, so that the signals are transmitted and received through multiple antennas at the transmitting end and the receiving end, improving the communication quality. It can make full use of space resources and achieve multiple transmissions and multiple receptions through multiple antennas, and can manyfold increase the system channel capacity without increasing spectrum resources and antenna transmission power.

In order to improve the coverage of the cell edge and provide the more balanced quality of service within the service area, the coordinated multi-point transmission technology is used in the prior art. The coordinated multi-point transmission technology can be roughly divided into two types: coherent and non-coherent transmission. Here, in the coherent transmission, each data layer may be mapped to multiple TRPs (Transmission Reception Points)/panels through weighted vectors. In the non-coherent transmission, each data stream is only mapped to a part of TRPs/panels.

The feedback of the CSI (Channel State Information) determines the performance of MIMO transmission, so it plays an important role in the entire MIMO design. The network-side device can perform the reasonable scheduling based on the CSI reported by a UE (User equipment). However, the feedback mechanism defined by the standard in the prior art directs at the single-point transmission and coherent multi-point transmission, and cannot yet support the multi-point non-coherent transmission, that is to say, a method of determining the CSI for the multi-point non-coherent transmission in the prior art.

BRIEF SUMMARY

The present application provides a method for determining channel state information, including:

determining, by a network side device, a measurement mode for CSI, and the measurement mode is that the network side device performs transmission using M codewords through transmission points corresponding to M DMRS (Demodulation Reference Signal) port groups, and M is greater than or equal to 1, and each of the codewords corresponds to one DMRS port group;

determining, by the network side device, N CSI-RS (Channel State Information-Reference Signal) resources according to the measurement mode, and the N CSI-RS resources are used by a terminal to determine CSI of transmission channels corresponding to the M codewords, the transmission channels corresponding to the codewords are transmission channels from transmission points of the codewords to the terminal, and M is less than or equal to N.

In some embodiments of the present application, the network side device determines the measurement mode firstly and determines different resources according to different measurement modes, and different resources have different functions. Through the above method, the embodiment of the present application can provide a method for determining the CSI suitable for multi-point non-coherent transmission.

Further, after the determining, by the network side, the N CSI-RS resources according to the measurement mode, the method further includes:

determining, by the network side device, indication information corresponding to the N CSI-RS resources, and the indication information corresponding to the N CSI-RS resources is used to indicate the terminal to determine the CSI of the transmission channels corresponding to the M codewords according to the N CSI-RS resources;

sending, by the network side device, the indication information corresponding to the N CSI-RS resources to the terminal.

Further, the sending, by the network side device, the indication information corresponding to the N CSI-RS resources to the terminal, includes:

adding, by the network side device, the indication information corresponding to the N CSI-RS resources into CSI-RS measurement resource parameters, and sending, by the network side device, the CSI-RS measurement resource parameters to the terminal, and the CSI-RS measurement resource parameters are used to indicate the terminal to measure according to the CSI-RS measurement resource parameters; or notifying, by the network side device, the terminal of the indication information corresponding to the N CSI-RS resources through high-level signaling; or notifying, by the network side device, the terminal of the indication information corresponding to the N CSI-RS resources through physical downlink signaling.

Further, after the determining, by the network side device, the N CSI-RS resources according to the measurement mode, the method further includes:

determining, by the network side device, a piece of CSI-RS configuration information, and the CSI-RS configuration information includes a CSI-RS measurement resource parameter and a report feedback parameter corresponding to the CSI-RS measurement resource parameter, the CSI-RS measurement resource parameter includes the indication information corresponding to the N CSI-RS resources, and the report feedback parameter is used to indicate content reported after measuring the CSI and a feedback mode to the terminal;

sending, by the network side device, the CSI-RS configuration information to the terminal.

Further, the indication information includes any one or more of first indication information, second indication information and third indication information;

for each of the CSI-RS resources, the first indication information is used to indicate the terminal to estimate channel estimation values of the transmission channels corresponding to the codewords;

for each of the CSI-RS resources, the second indication information is used to indicate the terminal to estimate an interference estimation value of interference with the terminal generated by codewords corresponding to the CSI-RS resource when receiving codewords corresponding to other CSI-RS resources;

for each of the CSI-RS resources, the third indication information is used to indicate the terminal to estimate noise received by the terminal; and/or the third indication information is used to indicate the terminal to estimate an interference estimation value of other interference with the terminal.

An embodiment of the present application further provides an apparatus for determining channel state information, including:

a measurement mode determining device configured to determine a measurement mode for the CSI, and the measurement mode is that the network side device performs transmission using M codewords through transmission points corresponding to M DMRS port groups, and M is greater than or equal to 1, and each of the codewords corresponds to one DMRS port group;

a resource determining device configured to determine N CSI-RS resources according to the measurement mode, and the N CSI-RS resources are used by a terminal to determine CSI of transmission channels corresponding to the M codewords, the transmission channels corresponding to the codewords are transmission channels from transmission points of the codewords to the terminal, and M is less than or equal to N.

In some embodiments of the present application, the measurement mode determining device and the resource determining device may configure resources for multi-point non-coherent transmission, so that the terminal can utilize the resources to determine the CSI of the multi-point non-coherent transmission.

Further, the resource determining device is configured to:

determine indication information corresponding to the N CSI-RS resources, and the indication information corresponding to the N CSI-RS resources is used to indicate the terminal to determine the CSI of the transmission channels corresponding to the M codewords according to the N CSI-RS resources;

send the indication information corresponding to the N CSI-RS resources to the terminal.

Further, the resource determining device is configured to:

add the indication information corresponding to the N CSI-RS resources into CSI-RS measurement resource parameters, and send the CSI-RS measurement resource parameters to the terminal, and the CSI-RS measurement resource parameters are used to indicate the terminal to measure according to the CSI-RS measurement resource parameters; or notify the terminal of the indication information corresponding to the N CSI-RS resources through high-level signaling; or notify the terminal of the indication information corresponding to the N CSI-RS resources through physical downlink signaling.

Further, the resource determining device is configured to:

determine a piece of CSI-RS configuration information, and the CSI-RS configuration information includes a CSI-RS measurement resource parameter and a report feedback parameter corresponding to the CSI-RS measurement resource parameter, the CSI-RS measurement resource parameter includes the indication information corresponding to the N CSI-RS resources, and the report feedback parameter is used to indicate content reported after measuring the CSI and a feedback mode to the terminal;

send the CSI-RS configuration information to the terminal.

Further, the indication information includes any one or more of first indication information, second indication information and third indication information;

for each of the CSI-RS resources, the first indication information is used to indicate the terminal to estimate channel estimation values of the transmission channels corresponding to the codewords;

for each of the CSI-RS resources, the second indication information is used to indicate the terminal to estimate an interference estimation value of interference with the terminal generated by codewords corresponding to the CSI-RS resource when receiving codewords corresponding to other CSI-RS resources;

for each of the CSI-RS resources, the third indication information is used to indicate the terminal to estimate noise received by the terminal; and/or the third indication information is used to indicate the terminal to estimate an interference estimation value of other interference with the terminal.

An embodiment of the present application further provides an electronic device, including:

at least one processor, and a memory communicatively connected to the at least one processor; and:

the memory stores instructions that are executable to the at least one processor, and the instructions are executed by the at least one processor to enable the at least one processor to perform any of the above methods.

An embodiment of the present application further provides a non-transitory computer readable storage medium storing computer instructions, which are configured to cause the computer perform any of the above methods.

The present application further provides a method for determining channel state information, including:

receiving, by a terminal, N CSI-RS resources sent by a network side device, and the N CSI-RS resources are determined by the network side device according to a measurement mode for CSI, and the measurement mode is that the network side device performs transmission using M codewords through transmission points corresponding to M DMRS port groups, and M is greater than or equal to 1, and each of the codewords corresponds to one DMRS port group;

determining, by the terminal, CSI of transmission channels corresponding to the M codewords according to the N CSI-RS resources, and the transmission channels are transmission channels from transmission points of the codewords to the terminal, and M is less than or equal to N.

In some embodiments of the present application, the terminal determines the CSI of the transmission channels corresponding to the M codewords according to the N CSI-RS resources set by the network side. The embodiment of the present application provides a method for determining the CSI suitable for multi-point non-coherent transmission.

Further, the determining, by the terminal, CSI of transmission channels corresponding to the M codewords according to the N CSI-RS resources, includes any one or more of:

for each of the CSI-RS resources, estimating, by the terminal, channel estimation values of the transmission channels corresponding to the codewords according to the CSI-RS resource;

for each of the CSI-RS resources, estimating, by the terminal, an interference estimation value of interference with the terminal generated by codewords corresponding to the CSI-RS resource when receiving codewords corresponding to other CSI-RS resources according to the CSI-RS resource;

for each of the CSI-RS resources, estimating, by the terminal, noise received by the terminal according to the CSI-RS resource;

for each of the CSI-RS resources, estimating, by the terminal, an interference estimation value of other interference with the terminal according to the CSI-RS resource.

Further, the method further includes:

acquiring, by the terminal, indication information corresponding to the N CSI-RS resources, and the indication information includes any one or more of first indication information, second indication information and third indication information;

for each of the CSI-RS resources, estimating, by the terminal, channel estimation values of the transmission channels corresponding to the codewords according to the CSI-RS resource, includes:

estimating, by the terminal, channel estimation values of the transmission channels corresponding to the codewords according to the first indication information and the CSI-RS resource, and the first indication information is used to indicate the terminal to estimate the channel estimation values of the transmission channels corresponding to the codewords;

for each of the CSI-RS resources, estimating, by the terminal, an interference estimation value of interference with the terminal generated by codewords corresponding to the CSI-RS resource when receiving codewords corresponding to other CSI-RS resources according to the CSI-RS resource, includes:

estimating, by the terminal, an interference estimation value of interference with the terminal generated by codewords corresponding to the CSI-RS resource when receiving codewords corresponding to other CSI-RS resources according to the second indication information and the CSI-RS resource, and the second indication information is used to indicate the terminal to estimate the interference estimation value of the interference with the terminal generated by codewords corresponding to the CSI-RS resource when receiving codewords corresponding to other CSI-RS resources;

for each of the CSI-RS resources, estimating, by the terminal, noise received by the terminal according to the CSI-RS resource, includes:

estimating, by the terminal, noise received by the terminal according to the third indication information and the CSI-RS resource, and the third indication information is used to indicate the terminal to estimate the noise received by the terminal;

for each of the CSI-RS resources, estimating, by the terminal, an interference estimation value of other interference with the terminal according to the CSI-RS resource, includes:

estimating, by the terminal, an interference estimation value of other interference with the terminal according to the third indication information and the CSI-RS resource, and the third indication information is further used to indicate the terminal to estimate the interference estimation value of other interference with the terminal.

Further, the acquiring, by the terminal, indication information corresponding to the N CSI-RS resources, includes:

receiving, by the terminal, a CSI-RS measurement resource parameter sent by the network side device, and the CSI-RS measurement resource parameter includes the indication information corresponding to the N CSI-RS resources; or receiving, by the terminal, high-level signaling sent by the network side device, and the high-level signaling includes the indication information corresponding to the N CSI-RS resources; or receiving, by the terminal, physical downlink signaling sent by the network side device, and the physical downlink signaling includes the indication information corresponding to the N CSI-RS resources.

Further, the acquiring, by the terminal, indication information corresponding to the N CSI-RS resources, includes:

determining, by the terminal, the indication information corresponding to the N CSI-RS resources according to a quantity of received CSI-RS resources and a binding relationship between the quantity of CSI-RS resources and the indication information.

Further, for each codeword, the CSI includes: PMI (Precoding Matrix Indicator) corresponding to CSI-RS resources corresponding to the codeword, RI (Rank Indication) corresponding to CSI-RS resources corresponding to the codeword, and CQI (Channel Quality Indicator) corresponding to the codeword.

Further, the determining, by the terminal, CSI of transmission channels corresponding to the M codewords according to the N CSI-RS resources, includes:

determining, by the terminal, CSI of transmission channels corresponding to the M codewords according to an assumption condition and the N CSI-RS resources;

and the assumption condition is:

for each of the CSI-RS resources, the terminal assumes that codewords corresponding to the CSI-RS resource sent via a DMRS port group corresponding to the CSI-RS resource use PMI/RI corresponding to the CSI-RS resource, and are transmitted to the terminal through a transmission point corresponding to the DMRS port group.

Further, the assumption condition further includes:

for each of the CSI-RS resources, the terminal assumes that the interference generated by codewords corresponding to other DMRS port group when receiving the codewords corresponding to the DMRS port group uses the PMI/RI corresponding to the CSI-RS resource, and is transmitted to the terminal through a transmission point corresponding to the DMRS port group.

Further, the determining, by the terminal, CSI of transmission channels corresponding to the M codewords according to the N CSI-RS resources, includes:

determining, by the terminal, CSI of transmission channels corresponding to N codewords according to the N CSI-RS resources;

reporting, by the terminal, the CSI of the transmission channels corresponding to the M codewords;

or determining, by the terminal, CSI of transmission channels corresponding to the M codewords according to M CSI-RS resources among the N CSI-RS resources, and the M CSI-RS resources correspond to the M codewords;

reporting, by the terminal, the CSI of the transmission channels corresponding to the M codewords.

An embodiment of the present application further provides an apparatus for determining channel state information, including:

a receiving device configured to receive N CSI-RS resources sent by a network side device, and the N CSI-RS resources are determined by the network side device according to a measurement mode for the CSI, and the measurement mode is that the network side device performs transmission using M codewords through transmission points corresponding to M DMRS port groups, and M is greater than or equal to 1, and each of the codewords corresponds to one DMRS port group;

a CSI determining device configured to determine CSI of transmission channels corresponding to the M codewords according to the N CSI-RS resources, and the transmission channels are transmission channels from transmission points of the codewords to the terminal, and M is less than or equal to N.

In some embodiments of the present application, the configured resources are received by the receiving device, and the CSI of the multi-point non-coherent transmission mode is determined by the CSI determining device through the configured resources.

Further, the CSI determining device is configured to: determine the CSI of transmission channels corresponding to the M codewords according to the N CSI-RS resources, including any one or more of:

for each of the CSI-RS resources, estimate channel estimation values of the transmission channels corresponding to the codewords according to the CSI-RS resource;

for each of the CSI-RS resources, estimate an interference estimation value of interference with the terminal generated by codewords corresponding to the CSI-RS resource when receiving codewords corresponding to other CSI-RS resources according to the CSI-RS resource;

for each of the CSI-RS resources, estimate the noise received by the terminal according to the CSI-RS resource;

for each of the CSI-RS resources, estimate an interference estimation value of other interference with the terminal according to the CSI-RS resource.

Further, the receiving device is further configured to:

acquire indication information corresponding to the N CSI-RS resources, and the indication information includes any one or more of first indication information, second indication information and third indication information;

the CSI determining device is configured to:

for each of the CSI-RS resources, estimate channel estimation values of the transmission channels corresponding to the codewords according to the first indication information and the CSI-RS resource, and the first indication information is used to indicate the terminal to estimate the channel estimation values of the transmission channels corresponding to the codewords;

for each of the CSI-RS resources, estimate an interference estimation value of interference with the terminal generated by codewords corresponding to the CSI-RS resource when receiving codewords corresponding to other CSI-RS resources according to the second indication information and the CSI-RS resource, and the second indication information is used to indicate the terminal to estimate the interference estimation value of the interference with the terminal generated by codewords corresponding to the CSI-RS resource when receiving codewords corresponding to other CSI-RS resources;

for each of the CSI-RS resources, estimate the noise received by the terminal according to the third indication information and the CSI-RS resource, wherein the third indication information is used to indicate the terminal to estimate the noise received by the terminal;

for each of the CSI-RS resources, estimate an interference estimation value of other interference with the terminal according to the third indication information and the CSI-RS resource, and the third indication information is further used to indicate the terminal to estimate the interference estimation value of other interference with the terminal.

Further, the receiving device is configured to:

receive a CSI-RS measurement resource parameter sent by the network side device, and the CSI-RS measurement resource parameter includes the indication information corresponding to the N CSI-RS resources; or receive high-level signaling sent by the network side device, and the high-level signaling includes the indication information corresponding to the N CSI-RS resources; or receive physical downlink signaling sent by the network side device, and the physical downlink signaling includes the indication information corresponding to the N CSI-RS resources.

Further, the receiving device is configured to:

determine the indication information corresponding to the N CSI-RS resources according to a quantity of received CSI-RS resources and a binding relationship between the quantity of CSI-RS resources and the indication information.

Further, for each codeword, the CSI includes: Precoding Matrix Indicator (PMI) corresponding to CSI-RS resources corresponding to the codeword, Rank Indication (RI) corresponding to CSI-RS resources corresponding to the codeword, and Channel Quality Indicator (CQI) corresponding to the codeword.

Further, the CSI determining device is configured to:

determine the CSI of transmission channels corresponding to the M codewords according to an assumption condition and the N CSI-RS resources;

and the assumption condition is:

for each of the CSI-RS resources, it is assumed that codewords corresponding to the CSI-RS resource sent via a DMRS port group corresponding to the CSI-RS resource use the PMI/RI corresponding to the CSI-RS resource, and are transmitted to the terminal through a transmission point corresponding to the DMRS port group.

Further, the assumption condition further includes:

for each of the CSI-RS resources, it is assumed that the interference of codewords corresponding to other DMRS port group when receiving the codewords corresponding to the DMRS port group uses the PMI/RI corresponding to the CSI-RS resource, and is transmitted to the terminal through a transmission point corresponding to the DMRS port group.

Further, the CSI determining device is configured to:

determine the CSI of transmission channels corresponding to N codewords according to the N CSI-RS resources;

report the CSI of the transmission channels corresponding to the M codewords;

or determine the CSI of transmission channels corresponding to the M codewords according to M CSI-RS resources among the N CSI-RS resources;

report the CSI of the transmission channels corresponding to the M codewords.

An embodiment of the present application further provides an electronic device, including:

at least one processor, and a memory communicatively connected to the at least one processor; and:

the memory stores instructions that are executable to the at least one processor, and the instructions are executed by the at least one processor to enable the at least one processor to perform any of the above methods.

An embodiment of the present application further provides a non-transitory computer readable storage medium storing computer instructions, which are configured to cause the computer perform any of the above methods.

BRIEF DESCRIPTION OF THE DRAWINGS

In order to illustrate the embodiments of the present application more clearly, the accompanying figures which need to be used in describing the embodiments will be introduced below briefly. Obviously the accompanying figures described below are only some embodiments of the present application.

DETAILED DESCRIPTION OF THE EMBODIMENTS

Embodiments of the present application are made more clearer, the present application will be further illustrated below in details with reference to the accompanying figures. The described embodiments are merely a part of the embodiments of the present application but not all the embodiments.

Figure 1:
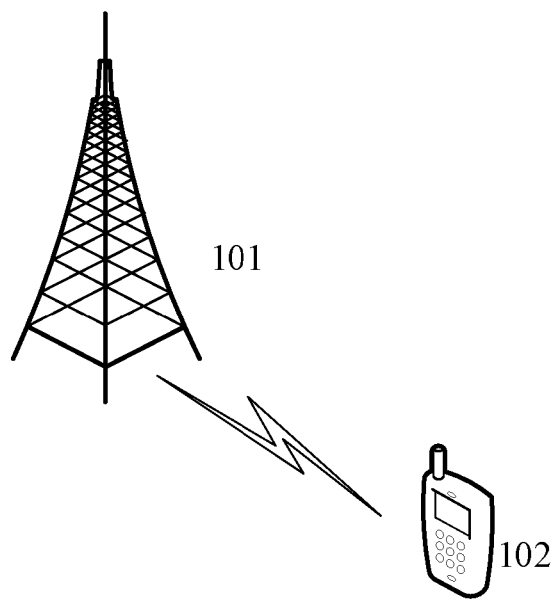
FIG. 1 is a structural schematic diagram of a communication architecture provided by an embodiment of the present application.

Refer to FIG. 1, FIG. 1 is an architectural schematic diagram of a communication system involved in an embodiment of the present application; and the communication system includes a network side device 101 and a terminal 102, and the terminal 102 and the network side device 101 communicate with each other through an air interface technology. The air interface technology may include: 2G (such as Global System for Mobile Communications (GSM)), 3G (UMTS (Universal Mobile Telecommunications System), WCDMA (Wideband Code Division Multiple Access), TD-SCDMA (Time Division-Synchronous Code Division Multiple Access)), 4G (such as FDD LTE, TDD LTE), and New RAT (Radio Access Technology) system, e.g., 5G system, etc.

The terminal 102 described in some embodiments of the present application will be introduced as a UE in the general sense. In addition, the terminal 102 may also be referred to as mobile station, access terminal, user device, user station, mobile station, remote station, remote terminal, mobile device, user terminal, user equipment, wireless communication device, user agent, or user device, etc. The user equipment may be a cellular phone, a cordless phone, a Session Initiation Protocol (SIP) phone, a Wireless Local Loop (WLL) station, a Personal Digital Assistant (PDA), a handheld device with wireless communication function, a computing device or other processing device connected to a wireless modem, a vehicle-carried device, a wearable device, a mobile station in the 5G network, or a user equipment in the future evolved Public Land Mobile Network (PLMN) network, etc. Furthermore, in some embodiments of the present application, the terminal 102 may also include a relay or other devices that can perform the data communication with the network side device 101 (for example, base station).

Figure 2:
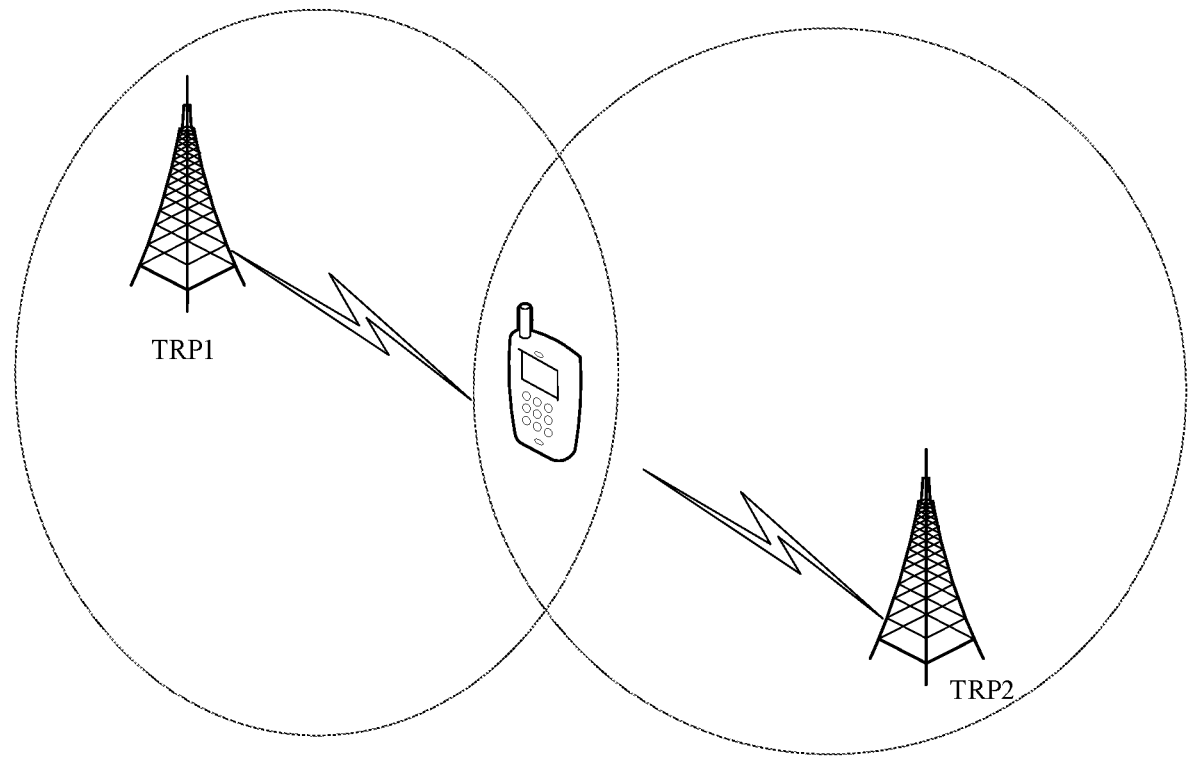
FIG. 2 is a structural schematic diagram of a communication architecture provided by an embodiment of the present application.

FIG. 2 is a schematic diagram of another application scenario provided by an embodiment of the present application. FIG. 2 shows a hypercell formed by high-density Transmission/Reception Points (TRPs). As shown in FIG. 2, in the high-density TRP transmission scenario, one terminal 102 can communicate with multiple transmission points to form a communication system with user equipment as center (UE-cellcenter-like). Generally, multiple transmission points that are adjacent in location can be divided into a group to form a group of transmission points shown in circles in the figure, which can be called a TRP set or a cooperative transmission collection. It should be noted that the division method of the TRP group is not limited to the division method based on location, and may also be other division methods, for example, the TRPs with strong correlation are divided into a group, which is not limited in the embodiment of the present application.

In one implementation, the transmission point may be a Base Transceiver Station (BTS) in the GSM system or CDMA system, or a NodeB in the WCDMA system, or an Evolved Node B (eNB or eNodeB) in the LTE system, or a network equipment such as base station or micro base station in the 5G network, which is not limited in the embodiment of the present application.

In one embodiment, in an embodiment of the present application, each transmission point may be each coordinated TRP (Transmission/Reception Point) or may be each coordinated antenna array (panel).

In an embodiment of the present application, in the case when multiple TRPs/panels perform cooperative transmission, the signals sent by different TRPs/panels may have relatively independent large-scale features, e.g., average delay, delay spread, average Doppler shift, Doppler spread and airspace reception parameters, etc. Therefore, in the NR system, the case that the large-scale parameters of two or more reference signal channels are the same is called QCL (Quasi Co-Location). Otherwise, it is called non-QCL.

In one embodiment, in an embodiment of the present application, all DMRS ports in the DMRS port group have a QCL relationship, that is, all DMRS ports in a group are QCL.

In one embodiment, in an embodiment of the present application, the DMRS ports in the same CDM (Code Division Multiplexing) group also have a QCL relationship.

In one embodiment, in an embodiment of the present application, each data channel supports at most two DMRS port groups.

In one embodiment, in an embodiment of the present application, one DMRS port group may be transmitted through one transmission point or two transmission points, and the DMRS ports corresponding to two transmission points also have a QCL relationship.

According to the system shown in FIG. 2, the terminal 102 transmits through multiple transmission points. In the Coordinated Multi-Point (CoMP) transmission mode, the prior art cannot provide a CSI determining method suitable for multi-point non-coherent transmission technology (NC-JT).

In one embodiment, in an embodiment of the present application, taking the case of sending at most two codewords as an example, the NC-JT can be roughly divided into following cases.

Case 1: each downlink Physical Downlink Control Channel (PDCCH) schedules the respective Physical Downlink Shared Channel (PDSCH), different PDSCHs are transmitted through different TRPs/panels, and each TRP/panel corresponds to one DMRS port group.

Case 2: one PDCCH schedules one PDSCH.

In one embodiment, in an embodiment of the present application, the case 2 corresponds to three transmission cases, which are respectively:

Case 2-1: M codewords are transmitted, each codeword transmission corresponds to one TRP/panel, and each TRP/panel corresponds to one DMRS port group;

Case 2-2: one codeword is transmitted, this one codeword is mapped to two TRPs/panels, and each TRP/panel corresponds to one DMRS port group;

Case 2-3: two codewords are transmitted, and one codeword is mapped to two TRPs/panels, the other is mapped to one TRP/panel, and each TRP/panel corresponds to one DMRS port group.

In one embodiment, in the embodiment of the present application, although the case 1 is a multi-point non-coherent transmission technology, different PDSCHs of each transmission point are transmitted through different TRPs/panels, which is similar to the case of single point transmission in the prior art, so the CSI feedback mechanism defined in existing standards can be used.

Figure 3:
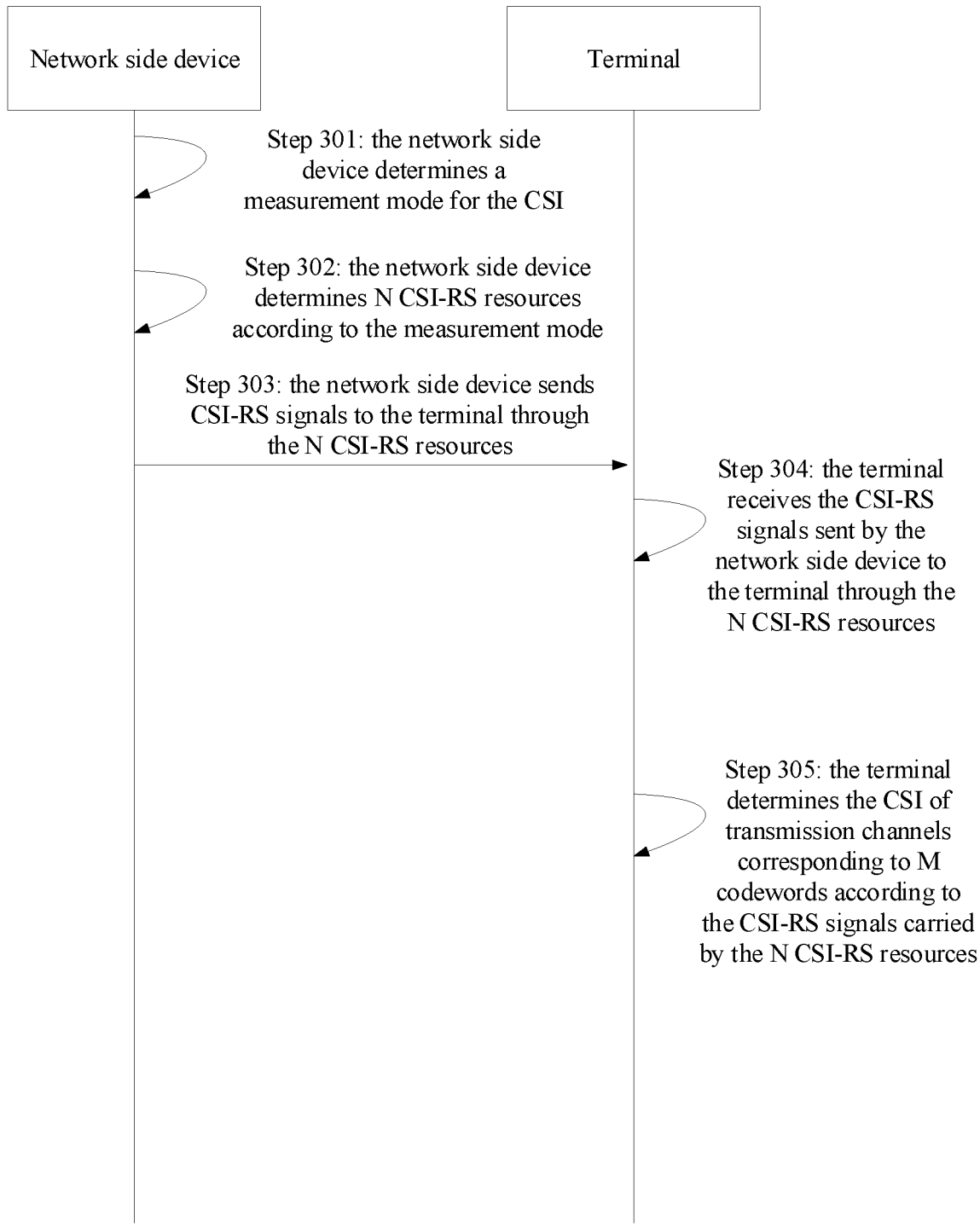
FIG. 3 is a flow schematic diagram of a method for determining channel state information provided by an embodiment of the present application.

For the case 2-1, an embodiment of the present application provides a method for determining CSI, as shown in FIG. 3, which includes:

Step 301: a network side device determines a measurement mode for the CSI; Step 302: the network side device determines N CSI-RS resources according to the measurement mode;

Step 303: the network side device sends CSI-RS signals to a terminal through the N CSI-RS resources;

Step 304: the terminal receives the CSI-RS signals sent by the network side device to the terminal through the N CSI-RS resources;

Step 305: the terminal determines the CSI of transmission channels corresponding to M codewords according to the CSI-RS signals carried by the N CSI-RS resources.

In step 301, when the network side device needs to configure CSI-RS resources for the terminal, it obtains the measurement mode for the CSI at first. In the embodiment of this application, the measurement mode is that the network side device performs transmission using M codewords through transmission points corresponding to M DMRS port groups, and M is greater than or equal to 1, and each codeword corresponds to one DMRS port group.

In some embodiments of the present application, the measurement mode determined by the network side device refers to the mode that the network side wants to use for transmission with the terminal side. The network side requires the terminal side to report the CSI of each codeword corresponding to the measurement mode, and the network side determines the transmission quality of the transmission mode through the reported CSI and further determines whether to perform transmission according to the transmission mode.

In some embodiments of the present application, the transmission mode assumed by the network side device is that the network side transmits M codewords to the terminal through transmission points corresponding to M DMRS port groups, and each DMRS port group corresponds to one codeword.

In step 302, the network side device determines N CSI-RS resources according to the measurement mode, where the N CSI-RS resources are used by the terminal to determine the CSI of transmission channels corresponding to the M codewords, the transmission channels corresponding to the codewords are transmission channels from transmission points of the codewords to the terminal, and M is less than or equal to N.

In some embodiments of the present application, although it is determined that M codewords are used for transmission in the measurement mode, the network side device is configured with M CSI-RS resources or more, so that the terminal can report the CSI of the transmission channels corresponding to the M codewords according to M CSI-RS resources or more, ensuring the accuracy of the report and providing many methods for determining the CSI for the terminal.

In one embodiment, in an embodiment of the present application, each CSI-RS resource corresponds to one codeword, that is, N CSI-RS resources configured by the network side device correspond to N codewords.

The network side device is configured with N CSI-RS resources, and a CSI-RS signal is transmitted on each CSI-RS resource. The terminal receives the CSI-RS signal on each CSI-RS resource, and determines the CSI of the transmission channels corresponding to M codewords according to the CSI-RS signals.

In step 303, the network side device sends a downlink reference signal to the terminal. In one embodiment, in an embodiment of the present application, the downlink reference signal is a CSI-RS signal.

In step 305, the terminal may determine the CSI of the transmission channels corresponding to M codewords by receiving the CSI-RS signals carried on the CSI-RS resources, or may determine the CSI of the transmission channels corresponding to M codewords by receiving the CSI-RS signals carried on the CSI-RS resources and the indication information corresponding to the CSI-RS resources, where the indication information corresponding to the CSI-RS resources is used to indicate the terminal to utilize the CSI-RS signals carried on the CSI-RS resources to determine the CSI of the transmission channels corresponding to M codewords.

In one embodiment, in an embodiment of the present application, the indication information corresponding to the CSI-RS resources may be sent by the network side device to the terminal, or may be acquired by the terminal itself.

In one embodiment, in an embodiment of the present application, if the indication information corresponding to the CSI-RS resources is sent by the network side device to the terminal, the network side device further needs to determine the indication information corresponding to N CSI-RS resources after determining the N CSI-RS resources, and send the indication information corresponding to N CSI-RS resources to the terminal.

In one embodiment, in an embodiment of the present application, the network side device notifies the terminal of the indication information corresponding to N CSI-RS resources through high-layer signaling.

In one embodiment, in an embodiment of the present application, the high-level signaling is RRC (Radio Resource Control) signaling.

In one embodiment, in an embodiment of the present application, the network side device notifies the terminal of the indication information corresponding to N CSI-RS resources through physical downlink signaling.

In one embodiment, in an embodiment of the present application, the physical downlink signaling may be the DCI (Downlink Control Information) carried by the PDCCH (Physical Downlink Control Channel).

Similarly, the terminal receives the CSI-RS measurement resource parameter sent by the network side device, where the CSI-RS measurement resource parameter includes the indication information corresponding to N CSI-RS resources; or the terminal receives the high-level signaling sent by the network side device, where the high-level signaling includes the indication information corresponding to N CSI-RS resources; or the terminal receives the physical downlink signaling sent by the network side device, where the physical downlink signaling includes the indication information corresponding to N CSI-RS resources.

In one embodiment, in an embodiment of the present application, after acquiring N CSI-RS resources, the terminal needs to measure the channel estimation values of the transmission channels corresponding to the codewords, and/or estimate the interference estimation value of the interference with the terminal generated by codewords corresponding to the CSI-RS resource when receiving codewords corresponding to other CSI-RS resources, and/or estimate the noise received by the terminal, and/or estimate the interference estimation value of other interference with the terminal, so the indication information corresponding to N CSI-RS resources determined by the network side device includes any one or more of the first indication information, the second indication information and the third indication information, and the first indication information is used to indicate the terminal to estimate the channel estimation values of the transmission channels corresponding to the codewords; the second indication information is used to indicate the terminal to estimate the interference estimation value of the interference with the terminal generated by codewords corresponding to the CSI-RS resource when receiving codewords corresponding to other CSI-RS resources; and the third indication information is used to indicate the terminal to estimate the interference estimation value of other interference with the terminal.

The above-mentioned other CSI-RS resources refer to resources other than N CSI-RS resources.

In an embodiment of the present application, the interference with the terminal generated by codewords corresponding to the CSI-RS resource when receiving codewords corresponding to other CSI-RS resources means that the terminal also receives the codewords corresponding to the CSI-RS resource while receiving the codewords corresponding to other CSI-RS resources, and then the transmission of the codewords corresponding to the CSI-RS resource will generate the interference with the codewords corresponding to other CSI-RS resources.

In an embodiment of the present application, other interference refers to the interference other than the interference estimation value of the interference generated by codewords corresponding to the CSI-RS resource when receiving codewords corresponding to other CSI-RS resources, for example, the data sent by the TRP1 to other terminals is other interference in FIG. 2.

In one embodiment, in an embodiment of the present application, the third indication information is used to indicate the terminal to estimate each layer of other interference with the terminal.

In an embodiment of the present application, the noise received by the terminal refers to the noise in mobile communications, and can be divided into internal noise and external noise, where the internal noise mainly refers to the inherent noise of the terminal receiver itself, and the external noise is mainly the natural noise and man-made noise.

In one embodiment, in an embodiment of the present application, after the network side device determines N CSI-RS resources according to the measurement mode, the network side device configures a piece of CSI-RS configuration information, which is used to instruct the terminal how to utilize CSI-RS resources to measure and report which CSI information to the network side device.

The CSI-RS configuration information includes a CSI-RS measurement resource parameter (Resource setting) and a report feedback parameter (Report setting) corresponding to the CSI-RS measurement resource parameter, where the CSI-RS measurement resource parameter is used to configure parameters of CSI-RS resources, and the report feedback parameter is used to configure the parameter content that the terminal feeds back to the network side device.

The report feedback parameter includes the configuration of the following parameters: CSI feedback parameter (report quantity), codebook configuration, time-domain behavior of CSI feedback, frequency-domain granularity of PMI and CQI, and measurement constraint configuration, and the CSI feedback parameter is used to indicate whether the UE performs the beam management-related feedback or the CSI obtains the related feedback.

In one embodiment, in an embodiment of the present application, N CSI-RS resources are managed through a CSI-RS resource set (Resource set), while the configuration information of CSI-RS resources on the CSI-RS resource set (Resource set) is configured through the CSI-RS measurement resource parameter (Resource setting).

After determining the CSI-RS configuration information, the network side device sends the CSI-RS configuration information to the terminal. After obtaining the CSI-RS configuration information, the terminal determines the usage of N CSI-RS resources according to the indication information corresponding to N CSI-RS resources in the CSI-RS measurement resource parameter, and determines the content of the fed-back CSI according to the report feedback parameter.

In one embodiment, in an embodiment of the present application, the network side device may also set other CSI-RS configuration information. For example, the network side device configures a piece of CSI-RS configuration information that includes three CSI-RS measurement resource parameters and one report feedback mechanism corresponding to the three CSI-RS measurement resource parameters, which are not repeated here.

In one embodiment, the terminal may further acquire the indication information corresponding to the N CSI-RS resources after receiving the N CSI-RS resources, and the terminal may determine the indication information corresponding to the N CSI-RS resources according to the number of received CSI-RS resources and a binding relationship between the number of CSI-RS resources and the indication information. The binding relationship in the embodiment of the present application is previously established and saved by the terminal.

In step 305, the terminal determines the CSI of the transmission channels corresponding to the M codewords according to the received N CSI-RS resources, which includes any one or more of:

for each CSI-RS resource, the terminal estimates the channel estimation values of the transmission channels corresponding to the codewords according to the CSI-RS resource;

for each CSI-RS resource, the terminal estimates the interference estimation value of the interference with the terminal generated by codewords corresponding to the CSI-RS resource when receiving codewords corresponding to other CSI-RS resources according to the CSI-RS resource;

for each CSI-RS resource, the terminal estimates the noise received by the terminal according to the CSI-RS resource;

for each CSI-RS resource, the terminal estimates the interference estimation value of other interference with the terminal according to the CSI-RS resource.

That is to say, the terminal can directly utilize the N CSI-RS resources to determine the CSI of the transmission channels corresponding to the M codewords.

Similarly, the terminal may also determine the CSI of the transmission channels corresponding to the M codewords according to the N CSI-RS resources and the indication information corresponding to the N CSI-RS resources.

In one embodiment, in an embodiment of the present application, the terminal may obtain a part of the indication information, for example, the terminal obtains the first indication information, and the terminal estimates the channel estimation values of the transmission channels corresponding to the codewords according to the first indication information and the CSI-RS resource; the terminal estimates the interference estimation value of the interference with the terminal generated by codewords corresponding to the CSI-RS resource when receiving codewords corresponding to other CSI-RS resources according to the CSI-RS resource; the terminal estimates the noise received by the terminal according to the CSI-RS resource; and the terminal estimates the interference estimation value of other interference with the terminal according to the CSI-RS resource.

In one embodiment, in an embodiment of the present application, for each codeword, the CSI includes: Precoding Matrix Indicator (PMI) corresponding to CSI-RS resources corresponding to the codeword, Rank Indication (RI) corresponding to CSI-RS resources corresponding to the codeword, and Channel Quality Indicator (CQI) corresponding to the codeword.

That is to say, in an embodiment of the present application, what the terminal reports to the network side device is the PMI/RI/CQI for each codeword. In one embodiment, in an embodiment of the present application, the terminal may determine the content of the report (which may be all or a part of the report) according to the report feedback parameter.

In one embodiment, in an embodiment of the present application, the PMI may be a high-precision PMI or a low-precision PMI.

In an embodiment of the present application, when the terminal determines the CSI of the transmission channels corresponding to the M codewords according to the N CSI-RS resources, the following assumption condition is included, that is, for each CSI-RS resource, the terminal assumes that the codewords corresponding to the CSI-RS resource sent via a DMRS port group corresponding to the CSI-RS resource use the PMI/RI corresponding to the CSI-RS resource, and the codewords are transmitted to the terminal through a transmission point corresponding to the DMRS port group.

That is to say, in an embodiment of the present application, when the terminal determines the CSI of the transmission channels corresponding to the M codewords, the terminal receives a codeword sent via the DMRS port group, where the codeword corresponds to one of the N CSI-RS resources, and the precoding of the codeword uses the PMI/RI corresponding to the CSI-RS resource.

In one embodiment, in an embodiment of the present application, for the case 2-1, each codeword corresponds to one CSI-RS resource, so the PMI/RI corresponding to each CSI-RS resource is also the PMI/RI corresponding to each codeword. In an embodiment of the present application, the PMI/RI corresponding to each codeword is pre-stored in the terminal.

In the above embodiments of the present application, the case assumed by the terminal is as shown in FIG. 2, that is, the TRP1 sends codewords to the terminal and the TRP2 sends no codeword to the terminal, or the TRP2 sends codewords to the terminal and the TRP1 sends no codeword to the terminal, or the TRP1 sends codewords to the terminal and the TRP2 sends codewords to the terminal.

In one embodiment, in an embodiment of the present application, the assumption condition also includes: for each CSI-RS resource, the terminal assumes that the interference of codewords corresponding to other DMRS port group when receiving the codewords corresponding to the DMRS port group uses the PMI/RI corresponding to the CSI-RS resource, and the codewords are transmitted to the terminal through a transmission point corresponding to the DMRS port group.

That is to say, in the embodiment of the present application, the case assumed by the terminal means that the terminal receives codewords from at least two DMRS port groups simultaneously, and for each codeword, the transmission of another codeword is the interference with the transmission of the codeword.

As shown in FIG. 2, the TRP1 sends the codeword 1 to the terminal, and the TRP2 sends the codeword 2 to the terminal. When the terminal receives the codeword 1, the transmission of the codeword 2 is the interference with the codeword 1. Similarly, when the terminal receives the codeword 2, the transmission of the codeword 1 is the interference with the codeword 2.

Of course, in an embodiment of the present application, the terminal also assumes that it has received other interference and/or noise during the transmission process.

In one embodiment, in an embodiment of the present application, the step in which the terminal determines the CSI of transmission channels corresponding to the M codewords according to the N CSI-RS resources includes:

the terminal determines the CSI of transmission channels corresponding to N codewords according to the N CSI-RS resources;

the terminal reports the CSI of the transmission channels corresponding to the M codewords;

or the terminal determines the CSI of transmission channels corresponding to the M codewords according to M CSI-RS resources among the N CSI-RS resources;

the terminal reports the CSI of the transmission channels corresponding to the M codewords.

That is to say, in an embodiment of this application, the terminal can select M CSI-RS resources from the acquired N CSI-RS resources, where the M CSI-RS resources correspond to M codewords, and the terminal determines the CSI of the transmission channels corresponding to the M codewords according to the M CSI-RS resources; or the terminal can determine the CSI of the transmission channels corresponding to N codewords according to the N CSI-RS resources and then select the CSI of the transmission channels corresponding to the M codewords for reporting.

Figure 4:
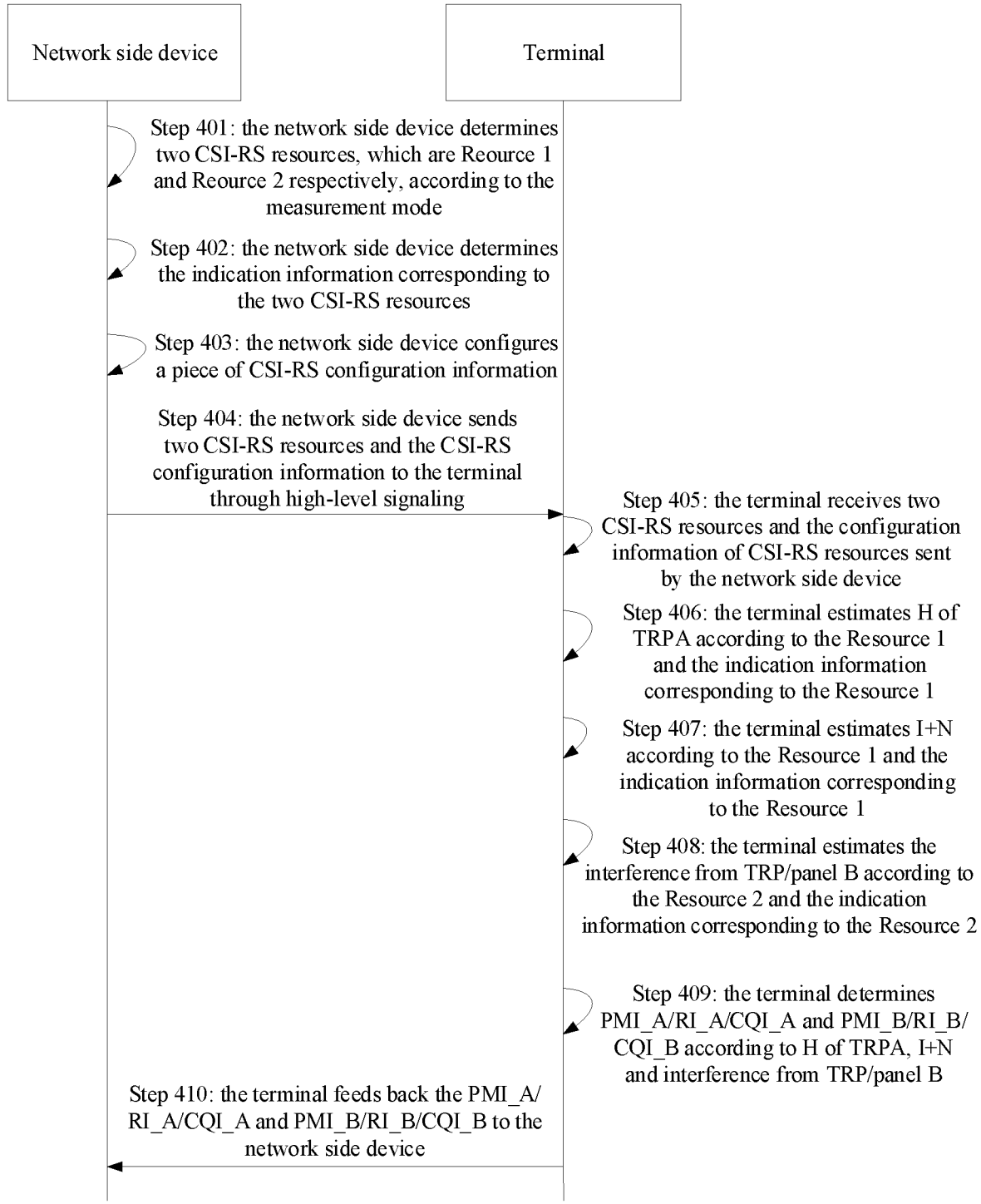
FIG. 4 is a flow schematic diagram of a method for determining channel state information provided by an embodiment of the present application.

In order to better explain the method for determining the channel state information provided by the embodiments of the present application, an example is given here. As shown in FIG. 4, in an embodiment of the present application, the measurement mode is that the network side device perform transmission using two codewords through the transmission points corresponding to two DMRS port groups, and each of the codewords corresponds to one DMRS port group.

Step 401: the network side device determines two CSI-RS resources, which are Resource 1 and Resource 2 respectively, according to the measurement mode.

Step 402: the network side device determines the indication information corresponding to the two CSI-RS resources:

for the Resource 1: it is used to estimate the channel from the TRP/panel A to the terminal; may also be used to estimate the interference caused by the signal sent by the TRP/panel A (codeword A) to the signal sent from the TRP/panel B (codeword B); and may also be used to estimate other interference and/or noise;

for the Resource 2: it is used to estimate the channel from the TRP/panel B to the terminal; and this channel may also be used to estimate the interference caused by the signal sent by the TRP/panel B (codeword B) to the signal sent from the TRP/panel A (codeword A); and may also be used to estimate other interference and/or noise.

Figure 5:
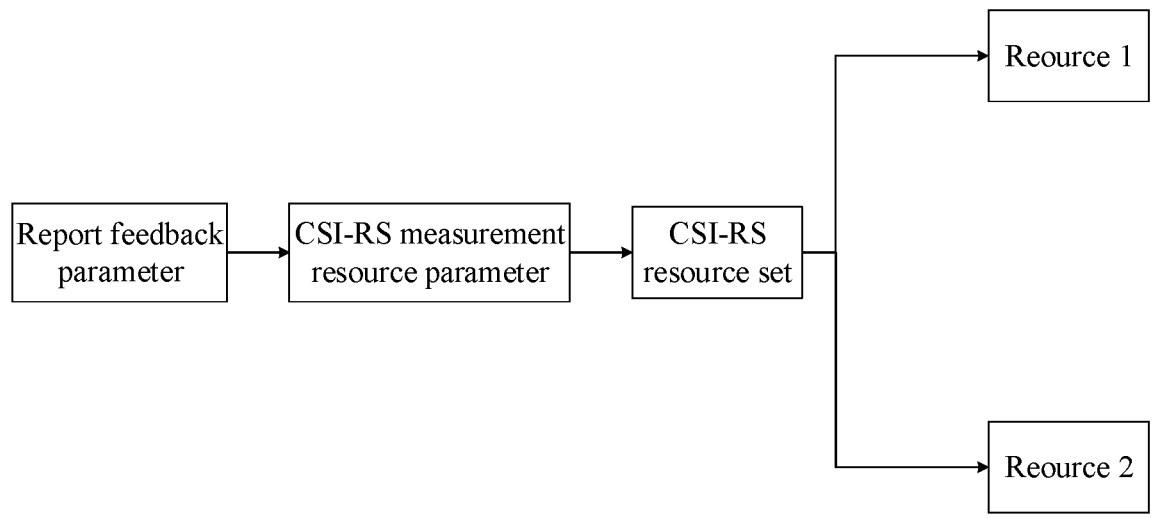
FIG. 5 is a structural schematic diagram of a CSI-RS configuration information provided by an embodiment of the present application.

Step 403: the network side device configures a piece of CSI-RS configuration information which includes a CSI-RS measurement resource parameter (Resource setting) and a report feedback parameter (Report setting) corresponding to the CSI-RS measurement resource parameter, manages N CSI-RS resources through a CSI-RS resource set (Resource set), and configures the configuration information of CSI-RS resources on the CSI-RS resource set (Resource set) through the CSI-RS measurement resource parameter (Resource setting), as shown in FIG. 5.

Step 404: the network side device sends two CSI-RS resources and the CSI-RS configuration information to the terminal through high-level signaling.

Step 405: the terminal receives two CSI-RS resources and the configuration information of CSI-RS resources sent by the network side device.

Step 406: the terminal estimates the channel from the TRP/panel A to the terminal (H of TRPA) according to the Resource 1 and the indication information corresponding to the Resource 1.

Step 407: the terminal estimates other interference and/or noise (I+N) according to the Resource 1 and the indication information corresponding to the Resource 1.

Step 408: the terminal estimates the interference caused by the signal (codeword B) sent by the TRP/panel B (DMRS port group B) (Interference from TRP/panel B) to the signal (codeword A) sent from the TRP/panel A according to the Resource 2 and the indication information corresponding to the Resource 2.

Step 409: the terminal determines the PMI/RI/CQI (denoted as PMI_A/RI_A/CQI_A) of the signal (codeword A) sent via the DMRS port group A (corresponding to the TRP/panel A) and the PMI/RI/CQI (denoted as PMI_B/RI_B/CQI_B) of the signal (codeword B) sent via the DMRS port group B (corresponding to the TRP/panel B) according to H of TRPA, I+N and Interference from TRP/panel B, and the terminal makes the following assumptions when determining the above CSI:

the signal (codeword A) sent via the DMRS port group A (corresponding to the TRP/panel A) uses the PMI_A/RI_A corresponding to the codeword A, and arrives at the terminal through the channel from the TRP/panel A to the terminal (estimated by the Resource 1);

the signal (codeword B) sent via the DMRS port group B (corresponding to the TRP/panel B) uses the PMI_B/RI_B corresponding to the codeword B, and arrives at the terminal through the channel from the TRP/panel B to the terminal (estimated by the Resource 2);

and, the terminal assumes that the interference from the codeword B to the codeword A uses the PMI_B/RI_B corresponding to the codeword B and arrives at the terminal through the channel from the TRP/panel B to the terminal (estimated by the Resource 2);

the interference from the codeword A to the codeword B uses the precoding matrix corresponding to the PMI_A/RI_A and arrives at the terminal through the channel from the TRP/panel A to the terminal (estimated by the Resource 1);

and, the terminal also assumes other interference/noise.

Step 410: the terminal feeds back the PMI_A/RI_A/CQI_A and PMI_B/RI_B/CQI_B to the network side device.

In some embodiments of the present application, the sequence of step 406 to step 408 can be exchanged.

Figure 6:
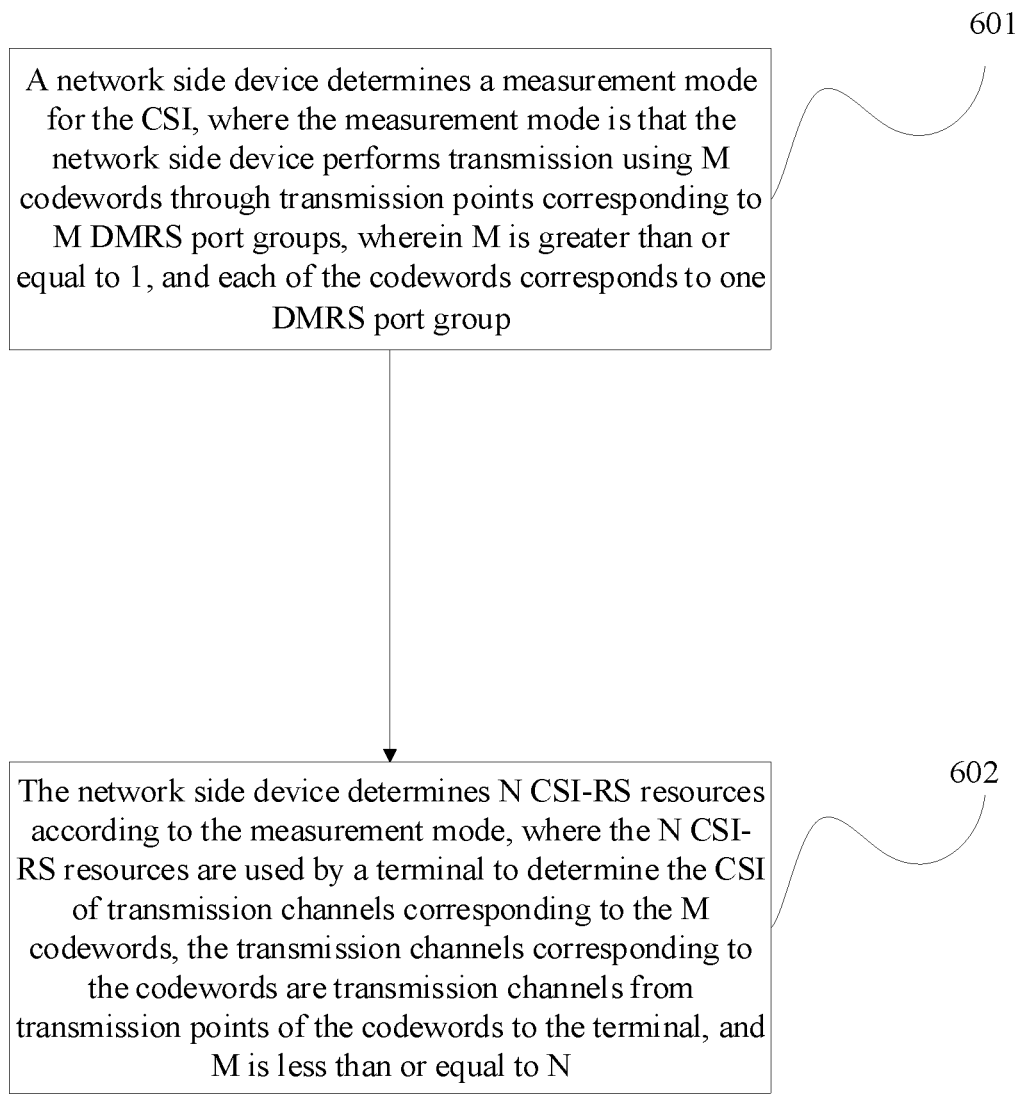
FIG. 6 is a flow schematic diagram of a method for determining channel state information provided by an embodiment of the present application.

Based on the structure of FIG. 1, an embodiment of the present application further provides a method for determining channel state information, as shown in FIG. 6, including:

Step 601: a network side device determines a measurement mode for the CSI, where the measurement mode is that the network side device performs transmission using M codewords through transmission points corresponding to M DMRS port groups, and M is greater than or equal to 1, and each of the codewords corresponds to one DMRS port group;

Step 602: the network side device determines N CSI-RS resources according to the measurement mode, where the N CSI-RS resources are used by a terminal to determine the CSI of transmission channels corresponding to the M codewords, the transmission channels corresponding to the codewords are transmission channels from transmission points of the codewords to the terminal, and M is less than or equal to N.

Figure 7:
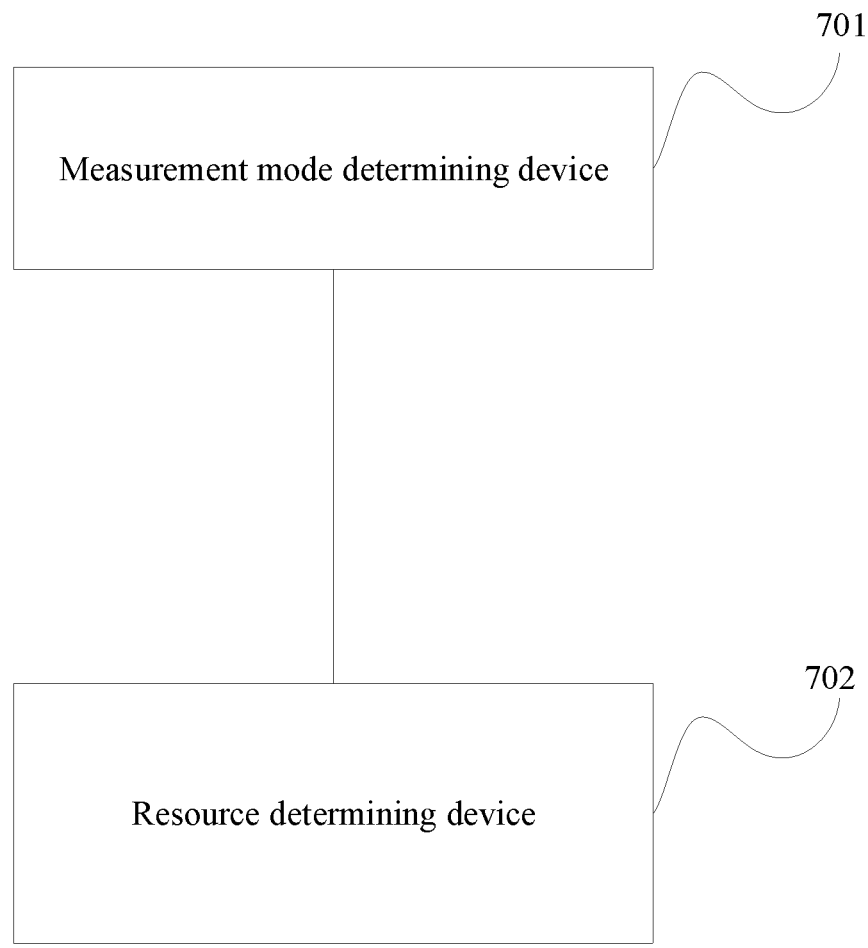
FIG. 7 is a structural schematic diagram of an apparatus for determining channel state information provided by an embodiment of the present application.

An embodiment of the present application further provides an apparatus for determining channel state information, as shown in FIG. 7, including:

a measurement mode determining device 701 configured to determine a measurement mode for the CSI, where the measurement mode is that the network side device performs transmission using M codewords through transmission points corresponding to M DMRS port groups, and M is greater than or equal to 1, and each of the codewords corresponds to one DMRS port group;

a resource determining device 702 configured to determine N CSI-RS resources according to the measurement mode, where the N CSI-RS resources are used by a terminal to determine CSI of transmission channels corresponding to the M codewords, the transmission channels corresponding to the codewords are transmission channels from transmission points of the codewords to the terminal, and M is less than or equal to N.

Figure 8:
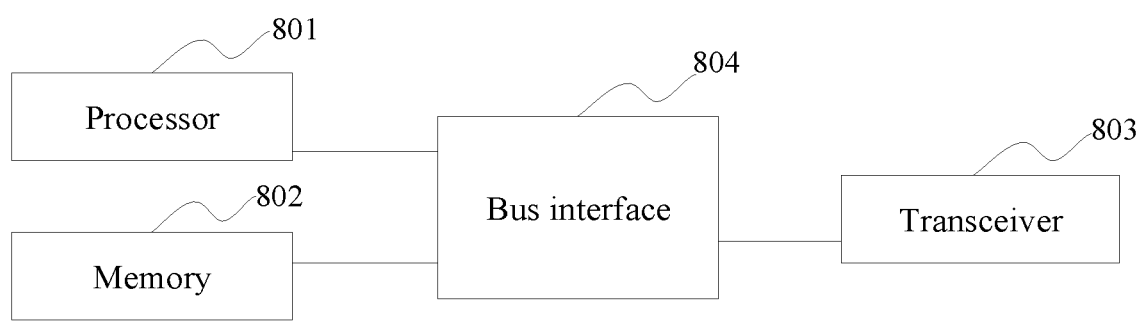
FIG. 8 is a structural schematic diagram of an electronic device provided by an embodiment of the present application.

Based on the same principle, the present application further provides an electronic device, as shown in FIG. 8, including:

a processor 801, a memory 802, a transceiver 803 and a bus interface 804, and the processor 801, the memory 802 and the transceiver 803 are connected through the bus interface 804.

The processor 801 is configured to read a program in the memory 802 to perform the following method:

determining a measurement mode for the CSI, where the measurement mode is that the network side device performs transmission using M codewords through transmission points corresponding to M DMRS port groups, and M is greater than or equal to 1, and each of the codewords corresponds to one DMRS port group;

determining N CSI-RS resources according to the measurement mode, where the N CSI-RS resources are used by a terminal to determine the CSI of transmission channels corresponding to the M codewords, the transmission channels corresponding to the codewords are transmission channels from transmission points of the codewords to the terminal, and M is less than or equal to N.

An embodiment of the present application provides a computer program product including computer programs stored on a non-transitory computer readable storage medium, where the computer programs include computer instructions which, when executed by a computer, cause the computer to perform any method for determining the channel state information described above.

Figure 9:
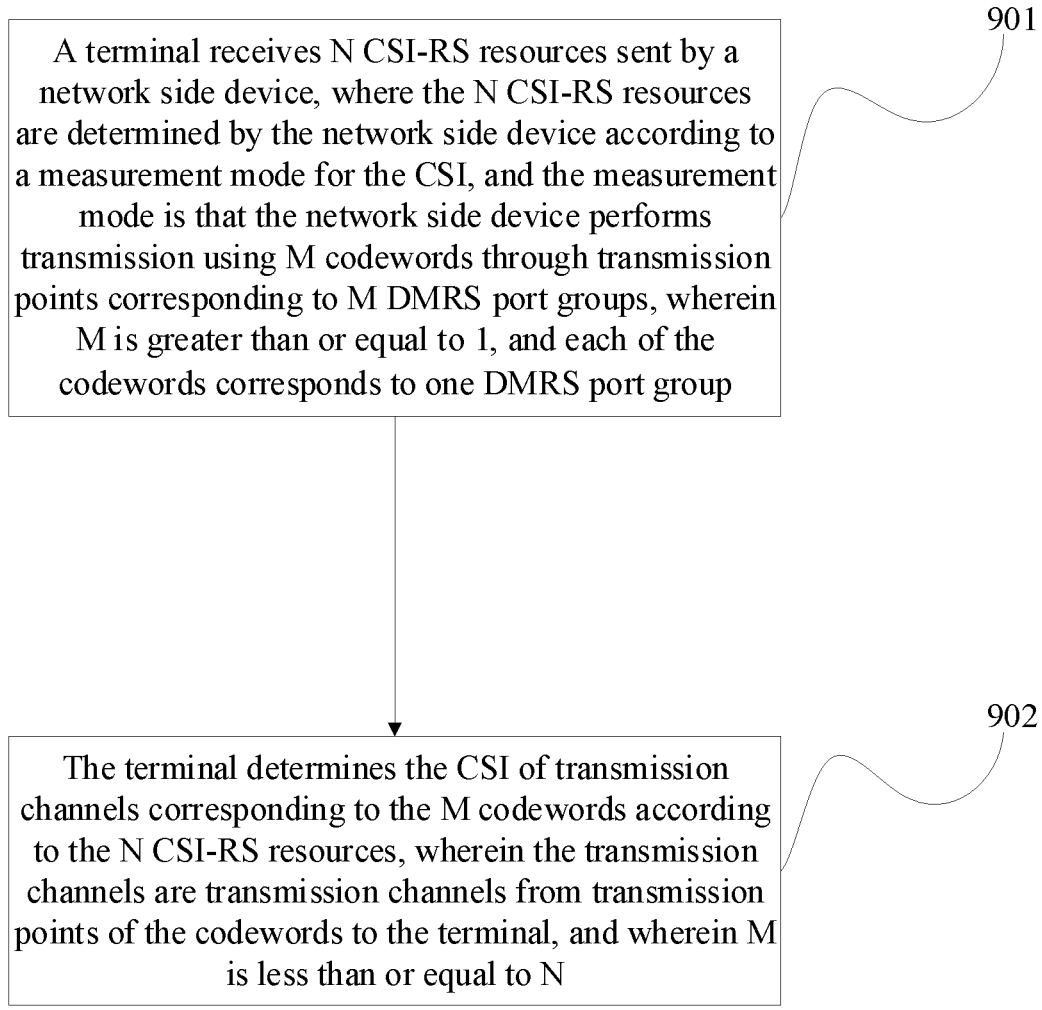
FIG. 9 is a flow schematic diagram of a method for determining channel state information provided by an embodiment of the present application.

The present application further provides a method for determining channel state information, as shown in FIG. 9, including:

Step 901: a terminal receives N CSI-RS resources sent by a network side device, where the N CSI-RS resources are determined by the network side device according to a measurement mode for the CSI, and the measurement mode is that the network side device performs transmission using M codewords through transmission points corresponding to M DMRS port groups, and M is greater than or equal to 1, and each of the codewords corresponds to one DMRS port group;

Step 902: the terminal determines the CSI of transmission channels corresponding to the M codewords according to the N CSI-RS resources, and the transmission channels are transmission channels from transmission points of the codewords to the terminal, and M is less than or equal to N.

Figure 10:
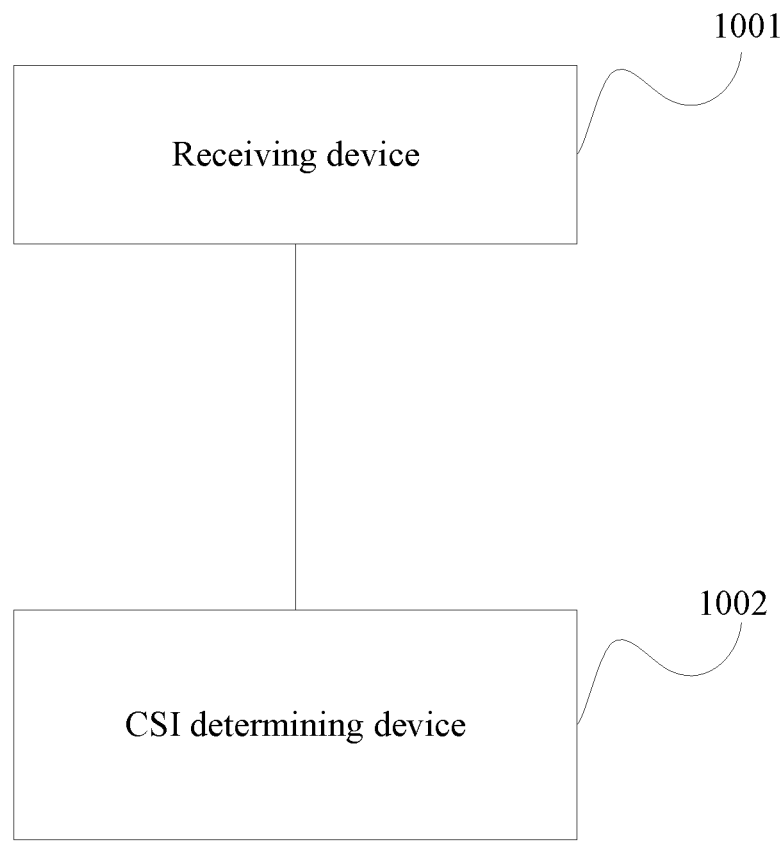
FIG. 10 is a structural schematic diagram of an apparatus for determining channel state information provided by an embodiment of the present application.

An embodiment of the present application further provides an apparatus for determining channel state information, as shown in FIG. 10, including:

a receiving device 1001 configured to receive N CSI-RS resources sent by a network side device, where the N CSI-RS resources are determined by the network side device according to a measurement mode for the CSI, and the measurement mode is that the network side device performs transmission using M codewords through transmission points corresponding to M DMRS port groups, and M is greater than or equal to 1, and each of the codewords corresponds to one DMRS port group;

a CSI determining device 1002 configured to determine the CSI of transmission channels corresponding to the M codewords according to the N CSI-RS resources, and the transmission channels are transmission channels from transmission points of the codewords to the terminal, and M is less than or equal to N.

Figure 11:
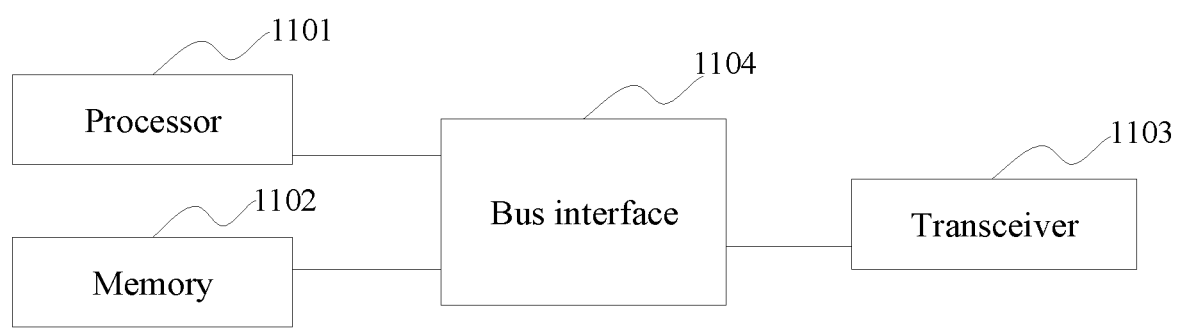
FIG. 11 is a structural schematic diagram of an electronic device provided by an embodiment of the present application.

Based on the same principle, the present application further provides an electronic device, as shown in FIG. 11, including:

a processor 1101, a memory 1102, a transceiver 1103 and a bus interface 1104, and the processor 1101, the memory 1102 and the transceiver 1103 are connected through the bus interface 1104.

The processor 1101 is configured to read a program in the memory 1102 to perform the following method:

receiving N CSI-RS resources sent by a network side device, where the N CSI-RS resources are determined by the network side device according to a measurement mode for the CSI, and the measurement mode is that the network side device performs transmission using M codewords through transmission points corresponding to M DMRS port groups, and M is greater than or equal to 1, and each of the codewords corresponds to one DMRS port group;

determining the CSI of transmission channels corresponding to the M codewords according to the N CSI-RS resources, and the transmission channels are transmission channels from transmission points of the codewords to the terminal, and M is less than or equal to N.

An embodiment of the present application provides a computer program product including computer programs stored on a non-transitory computer readable storage medium, where the computer programs include computer instructions which, when executed by a computer, cause the computer to perform any method for determining the channel state information described above.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for determining channel state information, comprises:
   determining, by a network side device, a measurement mode for Channel State Information, (CSI), wherein the measurement mode is that the network side device performs transmission using M codewords through transmission points corresponding to M Demodulation Reference Signal, (DMRS), port groups, wherein M is greater than or equal to 1, and each of the codewords corresponds to one DMRS port group;
   determining, by the network side device, N CSI-RS resources according to the measurement mode, wherein the N CSI-RS resources are used by a terminal to determine CSI of transmission channels corresponding to the M codewords, the transmission channels corresponding to the codewords are transmission channels from transmission points of the codewords to the terminal, and M is less than N;
   wherein after the determining, by the network side device, the N CSI-RS resources according to the measurement mode, the method further comprises:
   determining, by the network side device, indication information corresponding to the N CSI-RS resources, wherein the indication information corresponding to the N CSI-RS resources is used to indicate the terminal to determine the CSI of the transmission channels corresponding to the M codewords according to the N CSI-RS resources;
   sending, by the network side device, the indication information corresponding to the N CSI-RS resources to the terminal;
   wherein the indication information corresponding to the N CSI-RS resources comprises first indication information, second indication information and third indication information;
   for each of the CSI-RS resources, the first indication information is used to indicate the terminal to estimate channel estimation values of the transmission channels corresponding to the codewords;
   for each of the CSI-RS resources, the second indication information is used to indicate the terminal to estimate an interference estimation value of interference with the terminal generated by codewords corresponding to the CSI-RS resource when receiving codewords corresponding to other CSI-RS resources;
   for each of the CSI-RS resources, the third indication information is used to indicate the terminal to estimate noise received by the terminal, and indicate the terminal to estimate an interference estimation value of other interference with the terminal.

2. The method according to claim 1, wherein the sending, by the network side device, the indication information corresponding to the N CSI-RS resources to the terminal, comprises:
   adding, by the network side device, the indication information corresponding to the N CSI-RS resources into CSI-RS measurement resource parameters, and sending, by the network side device, the CSI-RS measurement resource parameters to the terminal, wherein the CSI-RS measurement resource parameters are used to indicate the terminal to measure according to the CSI-RS measurement resource parameters; or
   notifying, by the network side device, the terminal of the indication information corresponding to the N CSI-RS resources through high-level signaling; or
   notifying, by the network side device, the terminal of the indication information corresponding to the N CSI-RS resources through physical downlink signaling.

3. The method according to claim 2, wherein after the determining, by the network side device, the N CSI-RS resources according to the measurement mode, the method further comprises:
   determining, by the network side device, a piece of CSI-RS configuration information, wherein the CSI-RS configuration information comprises a CSI-RS measurement resource parameter and a report feedback parameter corresponding to the CSI-RS measurement resource parameter, the CSI-RS measurement resource parameter comprises the indication information corresponding to the N CSI-RS resources, and the report feedback parameter is used to indicate content reported after measuring the CSI and a feedback mode to the terminal;
   sending, by the network side device, the CSI-RS configuration information to the terminal.

4. A non-transitory computer readable storage medium, storing computer instructions which cause the computer to perform the method of claim 1.

5. A method for determining channel state information, comprises:
   receiving, by a terminal, N CSI-RS resources sent by a network side device, wherein the N CSI-RS resources are determined by the network side device according to a measurement mode for Channel State Information, (CSI), and the measurement mode is that the network side device performs transmission using M codewords through transmission points corresponding to M Demodulation Reference Signal, (DMRS), port groups, wherein M is greater than or equal to 1, and each of the codewords corresponds to one DMRS port group;
   determining, by the terminal, CSI of transmission channels corresponding to the M codewords according to the N CSI-RS resources, wherein the transmission channels are transmission channels from transmission points of the codewords to the terminal, and wherein M is less than N;
   wherein the determining, by the terminal, CSI of transmission channels corresponding to the M codewords according to the N CSI-RS resources, comprises any one or more of:
   for each of the CSI-RS resources, estimating, by the terminal, channel estimation values of the transmission channels corresponding to the codewords according to the CSI-RS resource;
   for each of the CSI-RS resources, estimating, by the terminal, an interference estimation value of interference with the terminal generated by codewords corresponding to the CSI-RS resource when receiving codewords corresponding to other CSI-RS resources according to the CSI-RS resource;
for each of the CSI-RS resources, estimating, by the terminal, noise received by the terminal according to the CSI-RS resource;
for each of the CSI-RS resources, estimating, by the terminal, an interference estimation value of other interference with the terminal according to the CSI-RS resource;
wherein the method further comprises:
acquiring, by the terminal, indication information corresponding to the N CSI-RS resources, wherein the indication information comprises first indication information, second indication information and third indication information;
for each of the CSI-RS resources, estimating, by the terminal, channel estimation values of the transmission channels corresponding to the codewords according to the CSI-RS resource, comprises:
estimating, by the terminal, channel estimation values of the transmission channels corresponding to the codewords according to the first indication information and the CSI-RS resource, wherein the first indication information is used to indicate the terminal to estimate the channel estimation values of the transmission channels corresponding to the codewords;
for each of the CSI-RS resources, estimating, by the terminal, an interference estimation value of interference with the terminal generated by codewords corresponding to the CSI-RS resource when receiving codewords corresponding to other CSI-RS resources according to the CSI-RS resource, comprises:
estimating, by the terminal, an interference estimation value of interference with the terminal generated by codewords corresponding to the CSI-RS resource when receiving codewords corresponding to other CSI-RS resources according to the second indication information and the CSI-RS resource, wherein the second indication information is used to indicate the terminal to estimate the interference estimation value of the interference with the terminal generated by codewords corresponding to the CSI-RS resource when receiving codewords corresponding to other CSI-RS resources;
for each of the CSI-RS resources, estimating, by the terminal, noise received by the terminal according to the CSI-RS resource, comprises:
estimating, by the terminal, noise received by the terminal according to the third indication information and the CSI-RS resource, wherein the third indication information is used to indicate the terminal to estimate the noise received by the terminal;
for each of the CSI-RS resources, estimating, by the terminal, an interference estimation value of other interference with the terminal according to the CSI-RS resource, comprises:
estimating, by the terminal, an interference estimation value of other interference with the terminal according to the third indication information and the CSI-RS resource, wherein the third indication information is further used to indicate.

6. The method according to claim 5, wherein the acquiring, by the terminal, indication information corresponding to the N CSI-RS resources, comprises:
receiving, by the terminal, a CSI-RS measurement resource parameter sent by the network side device, wherein the CSI-RS measurement resource parameter comprises the indication information corresponding to the N CSI-RS resources; or
receiving, by the terminal, high-level signaling sent by the network side device, wherein the high-level signaling comprises the indication information corresponding to the N CSI-RS resources; or
receiving, by the terminal, physical downlink signaling sent by the network side device, wherein the physical downlink signaling comprises the indication information corresponding to the N CSI-RS resources.

7. The method according to claim 5, wherein the acquiring, by the terminal, indication information corresponding to the N CSI-RS resources, comprises:
determining, by the terminal, the indication information corresponding to the N CSI-RS resources according to a quantity of received CSI-RS resources and a binding relationship between the quantity of CSI-RS resources and the indication information.

8. The method according to claim 5, wherein for each codeword, the CSI comprises:
Precoding Matrix Indicator, PMI, corresponding to CSI-RS resources corresponding to the codeword; Rank Indication, RI, corresponding to CSI-RS resources corresponding to the codeword; and Channel Quality Indicator, CQI, corresponding to the codeword.

9. The method according to claim 8, wherein the determining, by the terminal, CSI of transmission channels corresponding to the M codewords according to the N CSI-RS resources, comprises:
determining, by the terminal, CSI of transmission channels corresponding to the M codewords according to an assumption condition and the N CSI-RS resources;
wherein the assumption condition is:
for each of the CSI-RS resources, the terminal assumes that codewords corresponding to the CSI-RS resource sent via a DMRS port group corresponding to the CSI-RS resource use PMI/RI corresponding to the CSI-RS resource, and are transmitted to the terminal through a transmission point corresponding to the DMRS port group.

10. The method according to claim 9, wherein the assumption condition further comprises:
for each of the CSI-RS resources, the terminal assumes that interference generated by codewords corresponding to other DMRS port group when receiving the codewords corresponding to the DMRS port group uses the PMI/RI corresponding to the CSI-RS resource, and is transmitted to the terminal through a transmission point corresponding to the DMRS port group.

11. The method according to claim 5, wherein the determining, by the terminal, CSI of transmission channels corresponding to the M codewords according to the N CSI-RS resources, comprises:
determining, by the terminal, CSI of transmission channels corresponding to N codewords according to the N CSI-RS resources;
reporting, by the terminal, the CSI of the transmission channels corresponding to the M codewords;
or
determining, by the terminal, CSI of transmission channels corresponding to the M codewords according to M CSI-RS resources among the N CSI-RS resources;
reporting, by the terminal, the CSI of the transmission channels corresponding to the M codewords.

12. An electronic device, comprises:
at least one processor, and
a memory communicatively connected to the at least one processor; wherein:
the memory stores instructions that are executable to the at least one processor, and the instructions are executed by the at least one processor to enable the at least one processor to perform the method of claim 6.

13. A non-transitory computer readable storage medium, storing computer instructions which cause the computer to perform the method of claim 5.

14. An electronic device, comprises:
at least one processor, and
a memory communicatively connected to the at least one processor; wherein:
the memory stores instructions that are executable to the at least one processor, and the instructions are executed by the at least one processor to enable the at least one processor to perform followings:
determining, a measurement mode for Channel State Information, (CSI), wherein the measurement mode is that a network side device performs transmission using M codewords through transmission points corresponding to M Demodulation Reference Signal, (DMRS), port groups, wherein M is greater than or equal to 1, and each of the codewords corresponds to one DMRS port group;
determining N CSI-RS resources according to the measurement mode, wherein the N CSI-RS resources are used by a terminal to determine CSI of transmission channels corresponding to the M codewords, the transmission channels corresponding to the codewords are transmission channels from transmission points of the codewords to the terminal, and M is less than or equal to N, wherein after the determining, by the network side device, the N CSI-RS resources according to the measurement mode, the method further comprises:
determining, by the network side device, indication information corresponding to the N CSI-RS resources, wherein the indication information corresponding to the N CSI-RS resources is used to indicate the terminal to determine the CSI of the transmission channels corresponding to the M codewords according to the N CSI-RS resources;
sending, by the network side device, the indication information corresponding to the N CSI-RS resources to the terminal;
wherein the indication information corresponding to the N CSI-RS resources comprises first indication information, second indication information and third indication information;
for each of the CSI-RS resources, the first indication information is used to indicate the terminal to estimate channel estimation values of the transmission channels corresponding to the codewords;
for each of the CSI-RS resources, the second indication information is used to indicate the terminal to estimate an interference estimation value of interference with the terminal generated by codewords corresponding to the CSI-RS resource when receiving codewords corresponding to other CSI-RS resources;
for each of the CSI-RS resources, the third indication information is used to indicate the terminal to estimate noise received by the terminal, and indicate the terminal to estimate an interference estimation value of other interference with the terminal.

\* \* \* \* \*